(No Model.)
J. A. MATTESON.
HANGING AND ADJUSTING DEVICE FOR CORD.
No. 447,889. Patented Mar. 10, 1891.
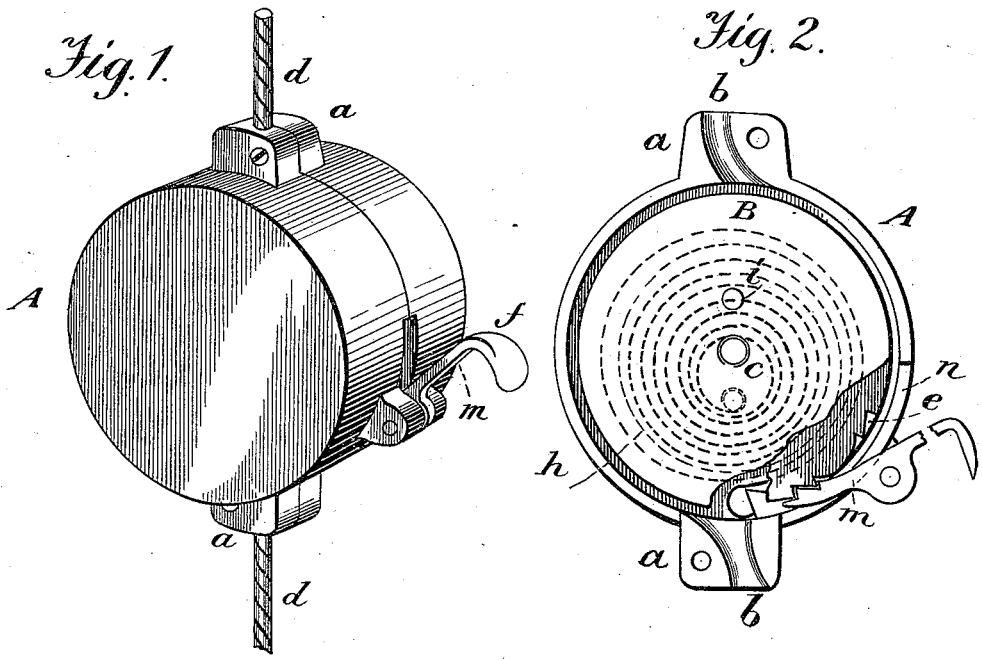
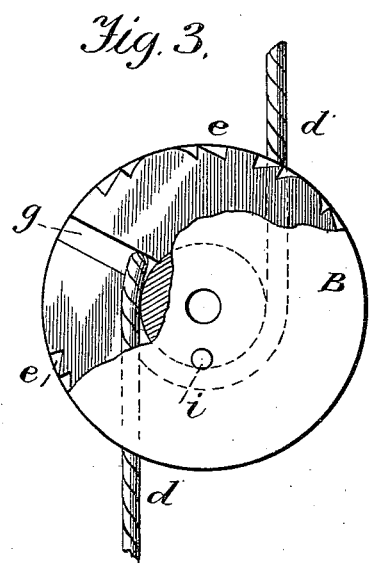
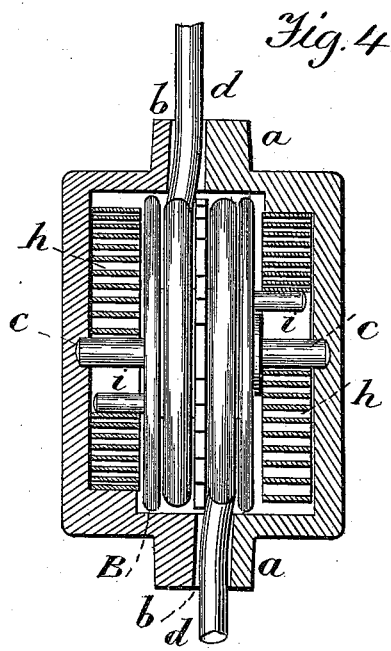
Witnesses.
A. Ruppert,
H. A. Daniels
Inventor.
James A. Matteson
Per
Thomas P. Simpson

UNITED STATES PATENT OFFICE.

JAMES A. MATTESON, OF RIVER POINT, RHODE ISLAND, ASSIGNOR OF ONE-THIRD TO HENRY B. WHITAKER, OF SAME PLACE.

HANGING AND ADJUSTING DEVICE FOR CORDS.

SPECIFICATION forming part of Letters Patent No. 447,889, dated March 10, 1891.

Application filed July 7, 1890. Serial No. 357,990. (No model.)

*To all whom it may concern:*

Be it known that I, JAMES A. MATTESON, a citizen of the United States, residing at River Point, in the county of Kent and State of Rhode Island, have invented certain new and useful Improvements in Hanging and Adjusting Devices for Cords; and I do hereby declare the following to be a full, clear, and exact description of the invention, such as will enable others skilled in the art to which it appertains to make and use the same.

This invention relates to devices for adjusting cords in length which are used in suspending electric hanging lights, bird-cages, and other articles; and it consists in certain improvements in the construction of such devices, as hereinafter described and claimed.

In the accompanying drawings, Figure 1 represents a perspective view of my device. Fig. 2 is a side view, certain parts being removed. Fig. 3 is a side view of a double pulley, a part being broken away. Fig. 4 is a central transverse section.

A designates the casing of the device, the same being circular and constructed in two corresponding parts, each of which is provided with perforated lugs $a$ for fastening-screws by which the parts are secured together. The two parts of the casing are notched at opposite points $b$, to form passages for the suspending-cord $d$, used in connection with the device.

On the shaft $c$, mounted in the case A, is placed a double pulley B, the middle portion of which is provided with a notch or open slot $g$, and has ratchet-teeth $e$ on its central periphery, as shown. Two fixed pins or studs $i$ extend from the pulley B, one being located on each side of said pulley at a point a short distance from the shaft $c$.

In each part of the case A is placed a coiled spring $h$, the outward end of which is connected with the casing, the inner end having a hook or eye to connect with one of the studs $i$ on the pulley B.

The operation of the device may be effected by one spring, but two are preferable.

A pawl $m$ is pivoted to the casing in an opening $n$, said pawl being in position to connect with the ratchet-teeth $e$ on the pulley. The said pawl is provided with a finger-piece $f$, by which it may be raised from the ratchet-teeth. The insulated wire or cord is placed in the slot $g$ in the middle portion of the pulley, and the two parts of the cord are wound therefrom on the pulley in its two grooves. The pulley is then placed in one part of the casing, with one of the fixed pins $i$ in the hook on the end of the coiled spring therein, and the shaft $c$ is inserted through the pulley and a washer placed on the shaft. The spring is then wound by turning the said part of the casing until there is some strain on it. The other part of the casing is then applied, with the other pin $i$ on the pulley extending into the hook on the coiled spring in said part, and the latter is turned to wind the spring. The cord is led through the opposite passages $b$. The two parts of the casing are secured together by screws and the pawl $m$ is pivoted in its place to connect with the teeth of the pulley and prevent its backward rotation.

As will be seen, the device may be applied to a suspending-cord or insulated wire without detaching the cord or wire from its connection at either end. The device being wound up, the cord passing through it may be readily lengthened by raising the detent or pawl $m$ from the pulley.

I claim—

A hanging and adjusting device for electric lights, consisting of the two-part case A, with outside perforated lugs $a$, openings $n$, cord-passages $b$, the pulley B, with slot $g$, two peripheral grooves, ratchet-teeth $e$, studs $i$, the shaft $h$, journaled in the center of case, the springs $h$ $h$, with hook at one end to engage stud $i$ and fastened at the other end to the case, and the pivoted pawl $m$, extending through the case, all constructed and arranged as shown and described.

In testimony whereof I have affixed my signature in presence of two witnesses.

JAMES A. MATTESON.

Witnesses:
E. C. CAPWELL,
L. C. BOWEN.